(12) United States Patent
Yang et al.

(10) Patent No.: US 6,693,981 B1
(45) Date of Patent: Feb. 17, 2004

(54) METHOD AND APPARATUS FOR IDENTIFYING BIT RATE

(75) Inventors: Kwang-Jin Yang, Yongin (KR); Bong-Sin Kwark, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/484,061

(22) Filed: Jan. 18, 2000

(30) Foreign Application Priority Data

Jan. 18, 1999 (KR) .......................................... 1999-1264

(51) Int. Cl.$^7$ ................................................. H04L 7/00
(52) U.S. Cl. ........................... 375/340; 29/311; 360/41; 359/158
(58) Field of Search ......................... 375/340; 329/311; 360/41; 359/158

(56) References Cited

U.S. PATENT DOCUMENTS 5,621,755 A * 4/1997 Bella et al. .................. 375/219
6,337,886 B1 * 1/2002 Asahi ......................... 375/316

OTHER PUBLICATIONS

Yamada et al. ("Burst–mode differential receiver for optical packet communication", Electronics Letters, Aug. 1, 1996, vol. 32, No. 16, pp. 1500–1501, Electronics Letters Online No: 19960986).*

Misawa et al. ("A Prototype Broadcast–and–Select Photonic ATM Switch with a WDM Output Bufer", Journal of Lightwave Technology, vol. 16, No. 12, Dec. 1998, pp. 2202–2211).*

* cited by examiner

*Primary Examiner*—Stephen Chin
*Assistant Examiner*—Guillermo Munos
(74) *Attorney, Agent, or Firm*—Robert E. Bushnell, Esq.

(57) ABSTRACT

A signal received in a wavelength division multiplexing system is delayed and an exclusive OR logical operation is performed on the received signal and the delayed received signal. Then, the direct current voltage of a selection signal which is a result of the operation is measured to identify the bit-rate of the received signal. When a mixture of various signals having different bit-rates are used over a network in the wavelength division multiplexing system, a receiving terminal can automatically recognize information on the bit-rate of a received optical signal and extract a reference clock signal from the received signal, thereby reproducing the received optical signal without distortion, using the clock signal.

40 Claims, 4 Drawing Sheets

METHOD AND APPARATUS FOR IDENTIFYING BIT RATE

CLAIM OF PRIORITY

This application makes reference to, incorporates the same herein, and claims all benefits accruing under 35 U.S.C. §119 from an application entitled Method and Apparatus for Identifying A Bit Rate earlier filed in the Korean Industrial Property Office on the 18th day of January 1999, and there duly assigned Ser. No. 99-1264, a copy of which is annexed hereto.

BACKGROUND OF THE INVENTION

1. Technical Field

The present invention relates to a method and apparatus for measuring the bit-rate of a received signal, and more particularly, to a method and apparatus for measuring the bit-rate of a received signal in a wavelength division multiplexing system.

2. Related Art

An optical fiber communication system consists of an information source, a transmitter or modulator, a transmission medium, and a receiver or demodulator at a destination point. The information source provides an electrical signal to the transmitter. The transmitter comprises an electrical stage which drives an optical source to give modulation of the light-wave carrier. The optical source which provides the electrical-optical conversion may be a semiconductor laser. The transmission medium consists of an optical fiber cable. The receiver consists of an optical detector which drives a further electrical stage and hence provides demodulation of the optical carrier. Thus there is a requirement for electrical interfacing at either end of the optical link. Fiber optic communications offer major advantages over wire systems because of low attenuation and high bandwidth available.

An optical fiber cable is an optical fiber waveguide having a core of a first refractive index $n_1$ surrounded by a transparent cladding of slightly lower refractive index $n_2$. The cladding supports the waveguide structure while also substantially reducing radiation loss into surrounding air. The optical fiber cable corresponds to a single cylindrical glass fiber having a diameter comparable to the diameter of a human hair. The optical fiber cable acts as an open optical waveguide. Light which is launched into an optical fiber at an angle less than an acceptance angle demonstrate total internal reflection in the core of the optical fiber. Periodic structures may be incorporated into planar waveguides to form integrated optical filters. An optical filter can be used to guide light to the core of an optical fiber causing the light to propagate in the core of that optical fiber.

Time division multiplexing (TDM) is a form of multiplexing in which different individual message signals are input to a multiplexer, are sampled periodically in order to create one group of interleaved pulses, and then the one group of interleaved pulses are output from the multiplexer. Then, the one group of interleaved pulses are transmitted along a single data transmission channel. In other words, the different individual message signals are combined to form a single signal. The single signal can have a much higher bit rate for transmission than any one of the different individual message signals. The group of interleaved pulses, also known as a train of pulses, is analyzed at the destination end of the single data transmission channel in order to recreate the original different individual message signals. Usually the data signals comprising the characters of each message are grouped as units of short duration, which are transmitted along with framing bits providing information for the transmission and receiving equipment. When using the time division multiplexing technique, the contents of the different individual message signals occupy the same transmission channel but during different moments in time.

Wavelength division multiplexing (WDM) is a form of multiplexing in which different individual message signals are input to a multiplexer, are combined, and then are output from the multiplexer. Then, the combined signals having different wavelengths are transmitted along a single data transmission channel such as a single optical fiber. Thus, components combine signals at several different wavelengths, the combined signals are transmitted through an optical fiber to a demultiplexer. There is minimal interference and minimal interaction among the signals while being transmitted along the optical fiber. The demultiplexer then splits them apart and routes them to their different destinations. Wavelength division multiplexing is becoming more important because it can multiply the transmission capacity of a single fiber without the installation of new cable.

I have found that optical communication systems can be inefficient and inconvenient, and I have found that there is a need for improved components related to wavelength division multiplexing systems.

SUMMARY OF THE INVENTION

To solve the aforementioned inefficiency and inconvenience, it is an objective of the present invention to provide a method for identifying the bit-rate of a received signal in a wavelength division multiplexing (WDM).

It is a further objective of the present invention to provide an apparatus for identifying the bit-rate of a received signal in a wavelength division multiplexing (WDM).

Accordingly, to achieve the above objectives and others, there is provided a method for identifying a bit-rate of a signal received in a wavelength division multiplexing system. The method includes the steps of delaying the received signal and comparing the delayed received signal with the original received signal based on a time slot to generate a selection signal, and extracting the bit-rate of the received signal by measuring a voltage level of the selection signal, such as a direct current (DC) voltage. The received signal can be considered to be an original signal.

The selection signal generating step includes the steps of duplicating the received signal to output two signals which are the same as the received signal, delaying one of the two same signals by a predetermined time, and performing an exclusive OR logic operation on a delayed signal and the other signal which is not delayed among the two same signals, to generate the selection signal. The delay step includes the steps of establishing a maximum bit-rate for measurement, calculating a 1-signal hold time corresponding to the established maximum bit-rate, and determining the delay time by multiplying the 1-signal hold time by a predetermined value.

The step of extracting the bit-rate includes the steps of filtering the selection signal, measuring the direct current voltage level of the filtered signal and determining the bit-rate of the received signal according to a range corresponding to the measured voltage level, and analog-to digital (A/D) converting the filtered signal.

There is also provided an apparatus for identifying a bit-rate of a signal received in a wavelength division multiplexing (WDM) system. Such an apparatus can be referred to as an identification unit. The apparatus includes a selection signal generator for delaying the received signal and comparing the delayed received signal with the original received signal based on a time slot to generate a selection signal, and a bit-rate extracting unit for determining the bit-rate of the received signal from a direct current voltage level of the selection signal. The received signal can be a data signal.

The selection signal generator includes a buffer for duplicating the received signal to output two signals which are the same as the received signal, a delay unit for receiving one of the two same signals and delaying that one signal by a predetermined time, and an operation unit. The operation unit receives the other one of the two same signals, which is directly transmitted from the buffer without delay, and also receives the delayed signal from the delay unit. The operation unit performs an exclusive OR logic operation on the two received signals to generate a bit-rate selection signal. The bit-rate extracting unit includes a filter for filtering the selection signal, and a determination unit for determining the bit-rate of the received signal from the direct current voltage level of the filtered signal.

To achieve these and other objects in accordance with the principles of the present invention, as embodied and broadly described, the present invention provides a method, comprising: receiving an original signal; delaying a first signal to generate a delayed signal, said first signal corresponding to said original signal; comparing said delayed signal with said original signal, and generating a selection signal in dependence upon said comparing; and identifying a bit-rate of said original signal by measuring a direct current voltage level of said selection signal.

To achieve these and other objects in accordance with the principles of the present invention, as embodied and broadly described, the present invention provides an apparatus, comprising: a signal generator receiving an original signal, delaying a first signal to generate a delayed signal, said first signal corresponding to said original signal, and comparing said original signal with said delayed signal based on a time slot to generate a selection signal; and a bit-rate extracting unit receiving said selection signal and determining a bit-rate of said original signal in dependence upon a direct current voltage level of said selection signal.

To achieve these and other objects in accordance with the principles of the present invention, as embodied and broadly described, the present invention provides a method for identifying a bit-rate of an original signal received in a wavelength division multiplexing transfer, the method comprising the steps of: receiving an original signal, delaying said original signal, comparing said delayed original signal with said original signal based on a time slot, generating a selection signal in dependence upon said comparing; and extracting a bit-rate of said original signal by measuring a voltage level of said selection signal.

To achieve these and other objects in accordance with the principles of the present invention, as embodied and broadly described, the present invention provides an apparatus for identifying a bit-rate of a signal received in a wavelength division multiplexing transfer, the apparatus comprising: a selection signal generator delaying an original signal to generate a delayed signal, comparing said original signal with said delayed signal based on a time slot to generate a selection signal; and a bit-rate extracting unit determining a bit-rate of said original signal from a voltage level of said selection signal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

Figure 1:
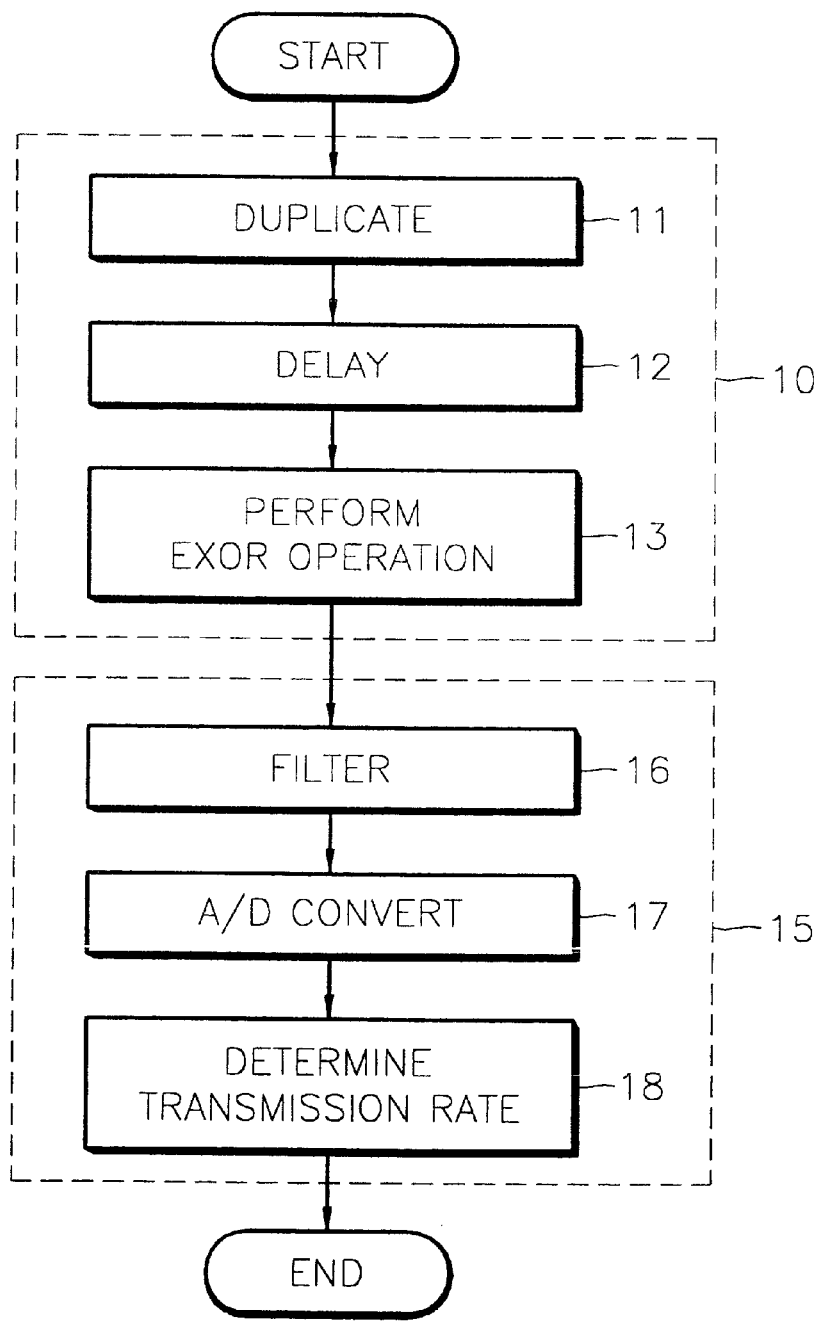
FIG. 1 is a flowchart showing a method for identifying a bit-rate, in accordance with the principles of the present invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Since an optical communication system modulates signals of a single bit-rate and transmits the modulated optical signals, a receiving terminal does not need to detect the bit-rate of received signals. However, as optical communication systems are being developed from a time division multiplexing (TDM) to a wavelength division multiplexing (WDM), data transfer is explosively increased with wavelength division multiplexing system in an urban area. This change is particularly appearing in metropolitan area networks (MAN). Accordingly, methods have been attempted for wavelength division multiplexing optical signals of different channels, which are to be transmitted at different bit-rates according to various protocols, into a single strand of optical fiber for transmission. In this occasion, an optical communication system needs the same clock signal as is used for a transmitted signal to generate a clear electric signal from the distorted received signal using a digital decision circuit. Accordingly, the optical communication system needs information on the modulation rate of the transmitted signal to extract or reproduce the clock signal from the received signal.

A wavelength division multiplexing (WDM) method in optical communication system generates an additional frequency band other than a reference frequency to form a virtual line through the optical fiber in a communication network. This method achieves the same effect as if a new cable network is wired, while using an existing communication network as it is. According to wavelength division multiplexing, a large amount of signal can be transmitted depending on the number of wavelength divisions. In wavelength division multiplexing, signals having different wavelengths are multiplexed and transferred through an optical fiber and, at the receiving side, the signals are demultiplexed according to the wavelengths of the signals. And the transmission capacity of the optical fiber can be increased. The wavelength division multiplexing method is an optical transmission technology which can effectively utilize a wide bandwidth provided by optical fiber by using different optical signal wavelengths simultaneously during optical transmission. In comparison with a time division multiplexing (TDM) method, the wavelength division multiplexing method is advantageous in mass transmission at a high speed since a large amount of signal can be transmitted due to the number of wavelength divisions. According to wavelength division multiplexing, in addition to increase of the capacity of a communication network, the speed of existing communication networks can be increased by five times. The same effect as if a new cable is constructed can be accomplished by only installing wavelength division multiplexing equipment at both ends of a cable network without constructing a new network. Theoretically, transmission capacity can be unlimitedly increased so that cost is drastically saved.

For example, when intending to construct a cable network of 10 gigabits per second (Gbps), a transmission apparatus having the capacity of 10 Gbps transfer rate can be implemented by using single 10 Gbps line or 4 channels, which operate at 2.5 Gbps, or 16 channels, which operate at 622 megabits per second (Mbps).

FIG. 1 is a flowchart showing a method for identifying a bit-rate according to the present invention. The method includes a step 10 of delaying a received signal in a wavelength division multiplexing system and comparing the delayed received signal with the original received signal based on a time slot to generate a selection signal, and a step 15 of extracting the bit-rate of the received signal based on a range corresponding to the voltage level of the selection signal.

The selection signal generating step 10 includes a step 11 of duplicating the received signal to output two same signals as the received signal. One of the same signals is delayed by a predetermined time in step 12. An exclusive OR (EXOR) logical operation is performed on the delayed signal and the other signal which is not delayed to generate the selection signal in step 13.

The bit-rate extraction step 15 includes a step 16 of filtering the selection signal. The filtered signal is analog-to-digital converted in step 17. The direct current voltage level of the filtered signal is measured and the bit-rate of the received signal is determined based on the range corresponding to the measured voltage level in step 18.

Figure 2:
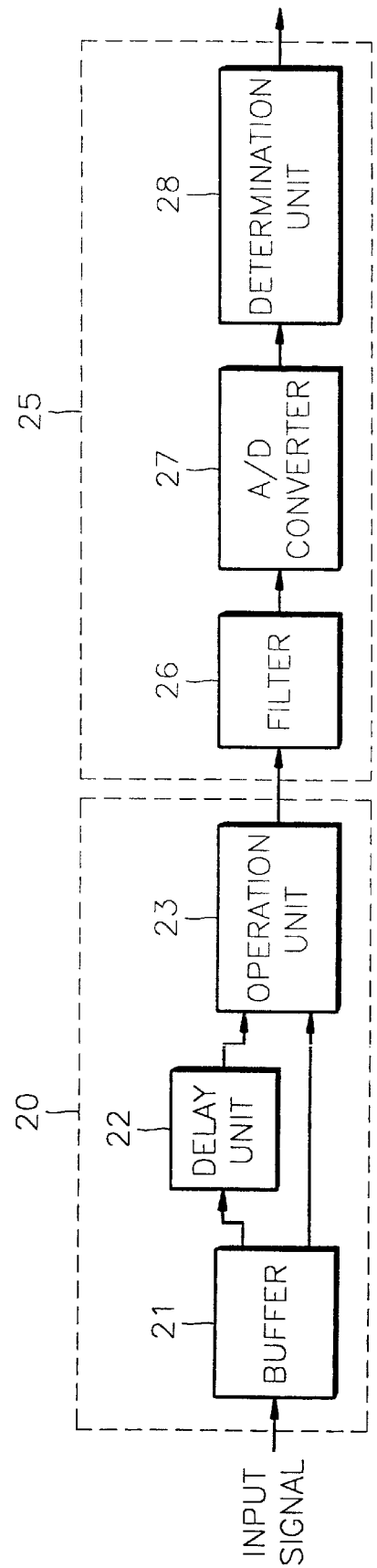
FIG. 2 is a block diagram of a bit-rate identification apparatus, in accordance with the principles of the present invention.

FIG. 2 is a block diagram of a bit-rate identification apparatus according to the present invention. The bit-rate identification apparatus includes a selection signal generator 20 for delaying a received signal in a wavelength division multiplexing system and comparing a delayed signal with the original received signal based on a time slot to generate a selection signal, and a bit-rate extracting unit 25 for determining the bit-rate of the received signal from the voltage level of the selection signal. The time slot can correspond to a time period.

The selection signal generator 20 includes a buffer 21 for duplicating a received signal and outputting two same signals as the received signal, a delay unit 22 for receiving one of the two signals and delaying the signal by a predetermined time, and an operation unit 23 for receiving one of the signals, which is directly transmitted from the buffer 21 without delay, and the signal from the delay unit 22 and performing an exclusive OR operation on the two signals to generate a bit-rate selection signal.

The bit-rate extracting unit 25 includes a filter 26 for filtering the selection signal and a determination unit 28 for determining the bit-rate of the received signal from the direct current voltage level of a filtered signal. The bit-rate extracting unit 25 preferably includes an analog-to-digital (A/D) converter 27 for analog-to-digital converting the filtered signal received from the filter 26.

Referring to FIGS. 1 and 2, the operation according to the method and apparatus shown in FIGS. 1 and 2 will be described with reference to an embodiment of the present invention. In the embodiment of the present invention, it is assumed that the bit-rate of a signal received by a receiving terminal is obtained in an optical communication system which performs intensity modulation on data of a non-return to zero (NRZ) mode.

Once a received signal is input to the buffer 21, the buffer 21 duplicates the received signal and outputs two signals which are the same as the received signal in step 11. A signal may be directly diverged from the received signal for duplication of the received signal. However, since the received signal is an optical signal, the power of diverged signals is decreased by one half. Even if power decreased signals are used, the present invention will be effective. However, in this embodiment, a buffer is employed in duplicating a received signal to generate signals having the same power as that of the original received signal.

One of the two same signals is input to the delay unit 22. The delay unit 22 delays the signal by the predetermined delay time in step 12. The delay step 12 preferably includes the steps of establishing a maximum bit-rate for measurement, calculating a cycle corresponding to the established maximum bit-rate and determining the delay time of the signal by multiplying the cycle by a predetermined value.

In the optical communication system, the bit-rate of a transmitting signal is not arbitrarily determined. For example, a signal is transmitted at a rate of 155 megabits per second (Mbps), 622 Mbps, 2.5 gigabits per second (Gbps) or etc. Accordingly, the maximum bit-rate of a signal is predetermined in a system. The maximum bit-rate varies depending on the type of optical communication system. A cycle corresponding to an established maximum bit-rate is easily obtained because it is the reciprocal of the bit-rate. By multiplying the cycle by a predetermined value, a delay time is determined. The predetermined value is preferably larger than 0 and smaller than 1. Particularly, it is preferably the predetermined value is 0.5. In other words, it is most preferable to delay an input signal by a fixed delay time which is half of the cycle corresponding to a maximum bit-rate.

The delayed signal of the delay unit 22 and the other signal, which is not input to the delay unit 22 among the output signals of the buffer 21, are input to the operation unit 23. The operation unit 23 performs an exclusive OR operation on the two input signals to generate a selection signal in step 13.

Figure 3A:
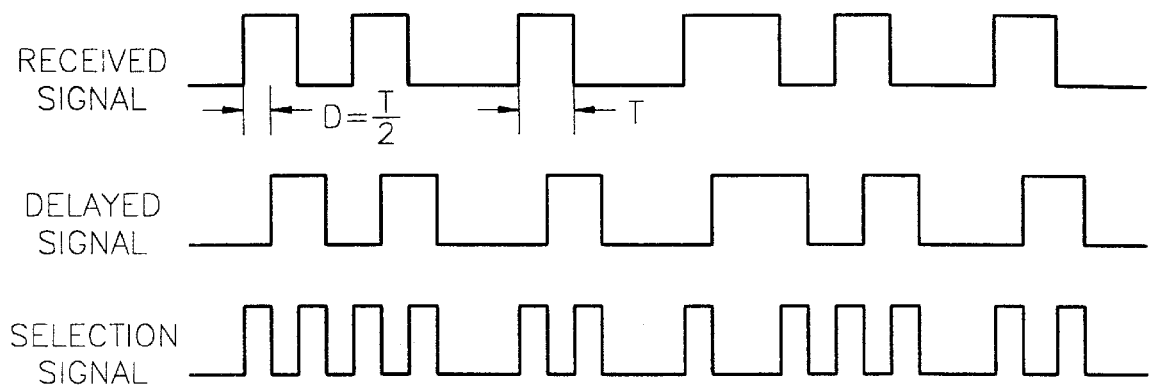
FIG. 3A shows a received signal, a delayed signal, and a selection signal resulting from performing an exclusive OR logical operation on the received and delayed signals, in accordance with the principles of the present invention.
Figure 3B:
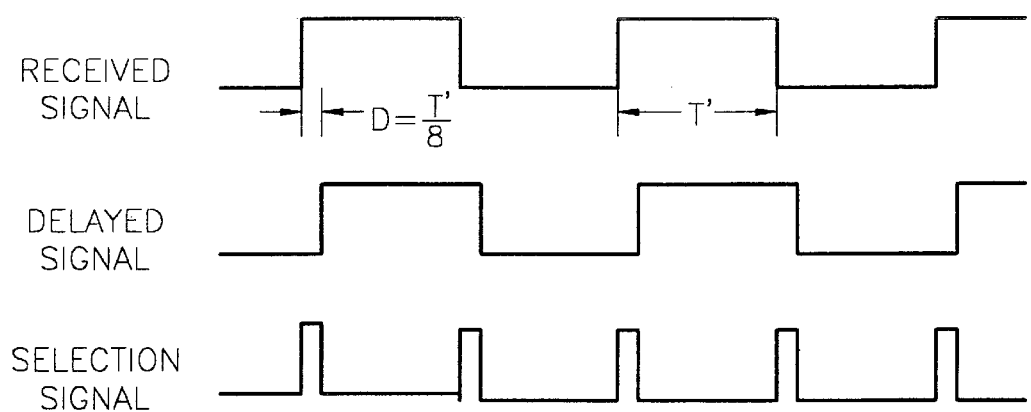
FIG. 3B shows a received signal, a delayed signal, and a selection signal resulting from performing an exclusive OR logical operation on the received and delayed signals, in accordance with the principles of the present invention, wherein the received signal shown in FIG. 3B has a different bit-rate than the received signal shown in FIG. 3A.

FIG. 3A shows a signal received at the established maximum bit-rate, its delayed signal, and a selection signal which is a result signal of performing an exclusive OR operation on the two signals. FIG. 3B shows a signal received at a bit-rate different from that of FIG. 3A. The bit rate of FIG. 3A is four times faster than the bit rate of FIG. 3B. FIG. 3B shows a received signal, a delayed signal, and a selection signal which is a result signal of performing an exclusive OR operation on the two signals.

In FIGS. 3A and 3B, the pattern of a received signal is "1010010011010010" and part of the pattern is shown in the drawings. A delay time D is half a 1-signal hold time T corresponding to the established maximum bit-rate in FIG. 3A. The same delay time D is applied in FIG. 3B. In the pattern, a 1-signal hold time is the time duration for which a single "1" or a single "0" is maintained. A 1-signal hold time (T'=T*4) according to the actual bit-rate (maximum bit-rate* ¼) shown in FIG. 3B and the delay time D are related by D=T'/8. When observing the radio frequency (RF) spectrum of the selection signal, it is seen that the direct current (DC) voltage level of the selection signal linearly corresponds to a bit-rate one to one.

The selection signal is input to the filter 26 and filtered in step 16. The filtering step 16 is preferably low pass filtering, since the low pass filtering removes high frequency band noise.

Figure 4:
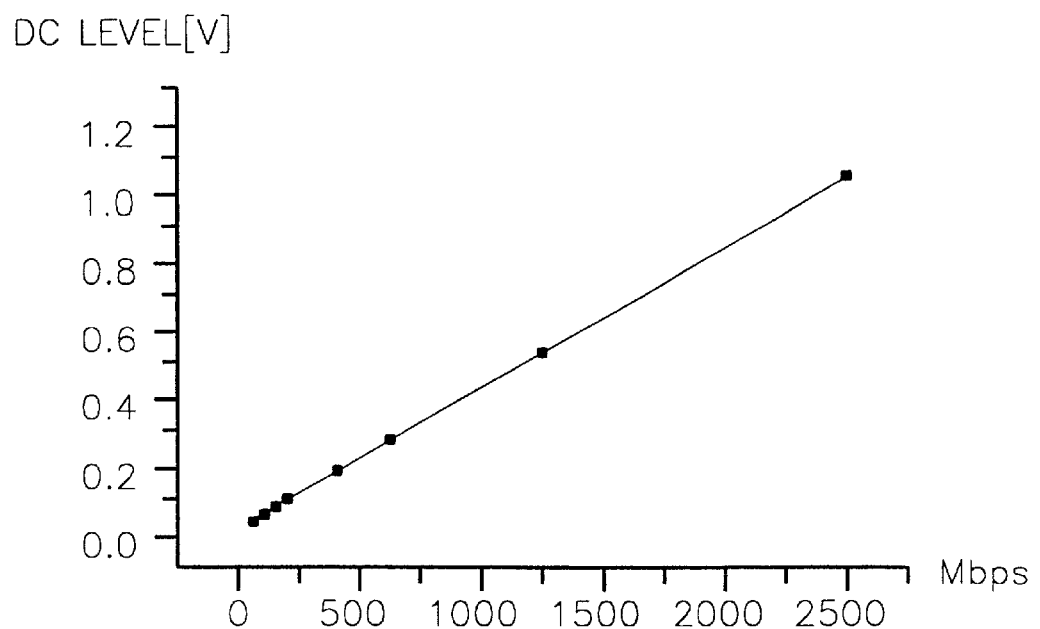
FIG. 4 shows the relation between the direct current (DC) level and bit rate of a selection signal of an apparatus, in accordance with the principles of the present invention.

FIG. 4 shows the relation between the direct current level and bit rate of a selection signal of an apparatus according to the present invention. The direct current voltage level of a filtered selection signal contains information on the bit-rate of the received signal. FIG. 4 shows results of measuring the direct current voltage levels of the filtered selection signal of the received signal while arbitrarily changing the bit rate of the transmitted signal from 100 Mbps through 2.5 Gbps. In FIG. 4, the slant of the straight line, which is based on results obtained using the signal as shown in FIG. 3A, is different from a slant of a line based on results obtained using the signals as shown in FIG. 3B.

The signal filtered by the filter 26 is input to the analog-to-digital (A/D) converter 27 and analog-to-digital converted in step 17. The converted signal is input to the determination unit 28. The determination unit 28 reads the digital value of the direct current voltage level of the filtered selection signal and identifies the bit-rate of the received signal in accordance with the value in step 18.

The direct current voltage level of the filtered selection signal is approximately determined in accordance with the rate of the received signal. The level is slightly changed according to the delay time which is obtained by multiplying a 1-signal hold time corresponding to the maximum bit-rate in the delay step 12. As mentioned above, in the optical communication system, the bit-rate of a transmitting signal is fixed to 155 megabits per second (Mbps), 622 megabits per second, 2.5 gigabits per second (Gbps) or etc. Accordingly, the approximate level of the direct current voltage of a selection signal is determined according to the bit-rate (for example, the direct current voltage level of a selection signal for the bit-rate of 2.5 gigabits per second (Gbps) is about 1.15 volts (V) in FIG. 4). Since the delay time only slightly changes the direct current (DC) voltage level of the selection signal, the determination unit 28 rarely fails in determining the bit-rate of a received signal due to changes in delay time.

The determination unit 28 may have a determination reference zone for each bit-rate, e.g., 155 Mbps, 622 Mbps or 2.5 Gbps (for example, referring to FIG. 4, the determination reference zone for 2.5 Gbps is from 1.0 volts to 1.2 volts). Accordingly, when a voltage level is detected, the determination unit 28 determines a corresponding bit-rate according to the detected voltage level.

The bit-rate of a signal extends from several megabits per second (Mbps) to several gigabits per second (Gbps). To easily detect the range of voltage level of a selection signal corresponding to a bit-rate, the determination unit 28 may convert the scale of the bit rate (X-axis) of a signal into a log value or the root of the value.

According to the present invention, a signal received in a wavelength division multiplexing system is delayed and an exclusive OR operation is performed on the received signal and a delayed signal. The direct current voltage of a selection signal which is a result of the operation is measured to identify the bit-rate of the received signal. Accordingly, when a mixture of various signals having different bit-rates are used over a network in the wavelength division multiplexing system, a receiving terminal can automatically recognize information on the bit-rate of a received optical signal and extract a reference clock signal from the received signal, thereby reproducing the received optical signal without distortion, using the clock signal.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method, comprising:
   receiving an original signal;
   delaying a first signal to generate a delayed signal, said first signal corresponding to said original signal;
   comparing said delayed signal with said original signal, and generating a selection signal in dependence upon said comparing; and
   identifying a bit-rate of said original signal by measuring a direct current voltage level of said selection signal.

2. The method of claim 1, said delaying of said first signal corresponding to delaying said first signal by a predetermined quantity of time.

3. The method of claim 2, said delaying of said first signal further comprising:
   establishing a maximum bit-rate;
   calculating a one-signal hold time corresponding to said established maximum bit-rate; and
   determining said predetermined quantity of time by multiplying said one-signal hold time by a predetermined value, said predetermined quantity of time corresponding to a delay time.

4. The method of claim 3, said predetermined value being larger than 0 and smaller than 1.

5. The method of claim 3, said predetermined value corresponding substantially to 0.5.

6. The method of claim 1, said comparing and generating further comprising performing an exclusive OR logic operation on said original signal and said delayed signal to generate said selection signal.

7. The method of claim 1, said original signal being received in a wavelength division multiplexing transfer.

8. The method of claim 1, said comparing being performed based on a time period.

9. The method of claim 1, said comparing being performed based on a time slot.

10. The method of claim 1, further comprising duplicating said original signal to output said first signal.

11. The method of claim 1, said identifying of said bit-rate further comprising filtering said selection signal to generate a filtered signal.

12. The method of claim 11, said filtering of said selection signal corresponding to low pass filtering.

13. The method of claim 11, said identifying of said bit-rate further comprising:
  measuring the direct current voltage level of said filtered signal; and
  determining said bit-rate of said original signal according to a range corresponding to the measured direct current voltage level of said filtered signal.

14. The method of claim 11, said identifying of said bit-rate further comprising converting said filtered signal from analog form to digital form.

15. The method of claim 11, said identifying of said bit-rate further comprising:
  converting said filtered signal from analog form to digital form;
  measuring the direct current voltage level of said filtered signal in the digital form; and
  determining said bit-rate of said original signal according to a range corresponding to the measured direct current voltage level of said filtered signal in the digital form.

16. An apparatus, comprising:
  a signal generator receiving an original signal, delaying a first signal to generate a delayed signal, said first signal corresponding to said original signal, and comparing said original signal with said delayed signal based on a time slot to generate a selection signal; and
  a bit-rate extracting unit receiving said selection signal and determining a bit-rate of said original signal in dependence upon a direct current voltage level of said selection signal.

17. The apparatus of claim 16, said original signal being received in a wavelength division multiplexing transfer.

18. The apparatus of claim 17, said signal generator comprising:
  a buffer duplicating said original signal and outputting said first signal and said original signal;
  a delay unit receiving said first signal, delaying said first signal by a predetermined quantity of time, and outputting said delayed signal; and
  an operation unit receiving said original signal and said delayed signal, and performing an exclusive OR logic operation on said original signal and said delayed signal to generate a bit-rate selection signal.

19. The apparatus of claim 18, said original signal being transmitted from said buffer to said operation unit without being delayed by said delay unit.

20. The apparatus of claim 19, said bit-rate extracting unit comprising:
  a filter receiving said selection signal, and filtering said selection signal to generate a filtered signal; and
  a determination unit determining said bit-rate of said original signal in dependence upon the direct current voltage level of said filtered signal.

21. The apparatus of claim 20, said bit-rate extracting unit farther comprising a converter receiving said filtered signal from said filter, converting said filtered signal from an analog form to a digital form, and outputting said filtered signal in the digital form to said determination unit.

22. The apparatus of claim 16, said signal generator comprising:
  a buffer duplicating said original signal and outputting said first signal and said original signal;
  a delay unit receiving said first signal, delaying said first signal by a predetermined quantity of time, and outputting said delayed signal; and
  an operation unit receiving said original signal and said delayed signal, and performing an exclusive OR logic operation on said original signal and said delayed signal to generate a bit-rate selection signal.

23. The apparatus of claim 22, said original signal being transmitted from said buffer to said operation unit without being delayed by said delay unit.

24. The apparatus of claim 23, said bit-rate extracting unit comprising:
  a filter filtering said selection signal to generate a filtered signal; and
  a determination unit determining said bit-rate of said original signal in dependence upon the direct current voltage level of said filtered signal.

25. The apparatus of claim 24, said bit-rate extracting unit further comprising a converter receiving said filtered signal from said filter, converting said filtered signal from an analog form to a digital form, and outputting said filtered signal in the digital form to said determination unit.

26. The apparatus of claim 16, said bit-rate extracting unit comprising:
  a filter receiving said selection signal, and filtering said selection signal to generate a filtered signal; and
  a determination unit determining said bit-rate of said original signal in dependence upon the direct current voltage level of said filtered signal.

27. The apparatus of claim 26, said bit-rate extracting unit further comprising a converter receiving said filtered signal from said filter, converting said filtered signal from an analog form to a digital form, and outputting said filtered signal in the digital form to said determination unit.

28. A method for identifying a bit-rate of an original signal received in a wavelength division multiplexing transfer, the method comprising the steps of:
  receiving an original signal, delaying said original signal, comparing said delayed original signal with said original signal based on a time slot, generating a selection signal in dependence upon said comparing; and
  extracting a bit-rate of said original signal by measuring a voltage level of said selection signal.

29. The method of claim 28, further comprising the steps of:
  duplicating said original signal to output first and second signals, said first and second signals each corresponding to said original signal;
  delaying said second signal by a predetermined time to generate said delayed signal; and
  performing an exclusive OR operation on said delayed signal and said first signal to generate said selection signal.

30. The method of claim 29, said delaying of said second signal comprising the steps of:

establishing a maximum bit-rate for measurement;

calculating a one-signal hold time corresponding to said established maximum bit-rate; and determining said predetermined time by multiplying said one-signal hold time by a predetermined value.

31. The method of claim 30, said predetermined time corresponding to a delay time.

32. The method of claim 31, said predetermined value used for said multiplying being greater than 0 and less than 1.

33. The method of claim 31, said predetermined value used for said multiplying being substantially 0.5.

34. The method of claim 28, said step of extracting said bit-rate comprising filtering said selection signal to generate a filtered signal.

35. The method of claim 34, said filtering corresponding to low pass filtering.

36. The method of claim 34, said step of extracting said bit-rate further comprising:

measuring the voltage level of said filtered signal; and determining said bit-rate of said original according to a range corresponding to the measured voltage level.

37. The method of claim 34, said step of extracting said bit-rate further comprising analog-to-digital converting said filtered signal.

38. An apparatus for identifying a bit-rate of a signal received in a wavelength division multiplexing transfer, the apparatus comprising:

a selection signal generator delaying an original signal to generate a delayed signal, comparing said original signal with said delayed signal based on a time slot to generate a selection signal; and a bit-rate extracting unit determining a bit-rate of said original signal from a voltage level of said selection signal.

39. The apparatus of claim 38, wherein said selection signal generator comprises:

a buffer duplicating said original signal to output a first signal and a second signal corresponding to said original signal;

a delay unit receiving said second signal, and delaying said second signal by a predetermined time; and an operation unit receiving said first signal directly transmitted from said buffer without delay, receiving said second signal from said delay unit, and performing an exclusive OR operation on said first and second signals to generate a bit-rate selection signal.

40. The apparatus of claim 38, said bit-rate extracting unit comprising:

a filter filtering said selection signal to generate a filtered signal; and a determination unit determining said bit-rate of said original signal from the voltage level of said filtered signal.

* * * * *